US006576863B1

United States Patent
Piltch et al.

(10) Patent No.: US 6,576,863 B1
(45) Date of Patent: Jun. 10, 2003

(54) LASER WELDING OF FUSED QUARTZ

(75) Inventors: Martin S. Piltch, Los Alamos, NM (US); Robert W. Carpenter, Santa Fe, NM (US); McIlwaine Archer, III, White Rock, NM (US)

(73) Assignee: Regents of the University of California, Oakland, CA (US)

( * ) Notice: Subject to any disclaimer, the term of this patent is extended or adjusted under 35 U.S.C. 154(b) by 19 days.

(21) Appl. No.: 09/849,807

(22) Filed: May 4, 2001

(51) Int. Cl.$^7$ .......................... B23K 26/20; B23K 26/14
(52) U.S. Cl. ............................ 219/121.64; 219/121.63; 219/121.82
(58) Field of Search ...................... 219/121.63, 121.64, 219/121.82

(56) References Cited

U.S. PATENT DOCUMENTS

| | | | |
|---|---|---|---|
| 3,860,784 A | * | 1/1975 | Brown et al. |
| 4,681,396 A | * | 7/1987 | Jones |
| 4,859,826 A | * | 8/1989 | Hess, III ............... 219/121.63 |
| 4,879,450 A | * | 11/1989 | Valentin et al. ........ 219/121.64 |
| 5,155,329 A | | 10/1992 | Terada et al. .......... 219/121.83 |
| 5,534,103 A | | 7/1996 | Yano et al. ............... 156/272.8 |
| 6,188,041 B1 | | 2/2001 | Kim et al. ............. 219/121.63 |
| 6,191,383 B1 | | 2/2001 | Jense .................... 219/121.63 |
| 2002/0053559 A1 | * | 5/2002 | Nikitin et al. .......... 219/121.64 |

FOREIGN PATENT DOCUMENTS

| | | | |
|---|---|---|---|
| DE | 3931401 A | * | 3/1991 |
| JP | 58-61991 A | * | 4/1983 ............ 219/121.64 |
| JP | 60-231587 A | * | 11/1985 |
| JP | 4-182322 A | * | 6/1992 |
| JP | 4-300260 A | * | 10/1992 |
| RU | 2099296 C1 | * | 12/1997 |

OTHER PUBLICATIONS

Luxon et al., Industrial Lasers and Their Applications, 2nd edition, Dec. 1992, Prentice Hall, pp. 147–148.*

* cited by examiner

*Primary Examiner*—Geoffrey S. Evans
(74) *Attorney, Agent, or Firm*—Madson & Metcalf

(57) ABSTRACT

Refractory materials, such as fused quartz plates and rods are welded using a heat source, such as a high power continuous wave carbon dioxide laser. The radiation is optimized through a process of varying the power, the focus, and the feed rates of the laser such that full penetration welds may be accomplished. The process of optimization varies the characteristic wavelengths of the laser until the radiation is almost completely absorbed by the refractory material, thereby leading to a very rapid heating of the material to the melting point. This optimization naturally occurs when a carbon dioxide laser is used to weld quartz. As such this method of quartz welding creates a minimum sized heat-affected zone. Furthermore, the welding apparatus and process requires a ventilation system to carry away the silicon oxides that are produced during the welding process to avoid the deposition of the silicon oxides on the surface of the quartz plates or the contamination of the welds with the silicon oxides.

30 Claims, 3 Drawing Sheets

LASER WELDING OF FUSED QUARTZ

GOVERNMENT RIGHTS

This invention was made with Government support under Contract Number W-7405-ENG-36 awarded by the United States Department of Energy to The Regents of the University of California. The Government has certain rights in the invention.

BACKGROUND OF THE INVENTION

1. Field of the Invention

The present invention relates generally to welding of refractory materials with low expansion and loss coefficients. More specifically, the present invention applies to welding of fused quartz using a high power LASER (Light Amplification by Stimulated Emission of Radiation) as a heat source.

2. Description of Related Art

Laser welding or laser fusing is the process of uniting two formerly separate pieces of material by the application of heat via an intense energy beam along the area of contact between the pieces. The physical barriers originally associated with the separate pieces of material along the area of contact are changed, thereby allowing the pieces to join. One method of accomplishing this task is melting or softening the edges of materials and compressing them. In many cases a filler rod is used to place filler material in gaps between angled pieces of material to be joined. The filler rod melts when exposed to the heat source and joins with the contact areas of the pieces being welded. Generally this has the effect of reinforcing the weld, but occasionally the process will introduce impurities into the weld between the materials, thereby making the weld weaker.

Unfortunately, even in laser welding, one of the weakest spots in a weld is the weld joint. This weakness may be attributed to a variety of reasons. For example, the filler material may not successfully bond with the materials being joined; as is often true in the case of quartz. Furthermore, the thermal expansion of the material during the welding process often creates or introduces imperfections into the materials being joined. For example, materials with a high thermal expansion coefficient introduce solidification cracking as the weld cools. In addition, the laser welding process often introduces impurities into the materials that weaken the material. For example, laser-welding quartz generates silicon oxides, which contaminate the weld or are deposited on the quartz surfaces. What is needed is a method of generating a full penetration weld without introducing structural weakness.

In addition to properly welding materials that other heat sources can join, laser heat sources are also useful in welding materials that are difficult to join, such as high carbon stainless steels and titanium. In fact, lasers may even be used to weld dissimilar materials, which would otherwise be incompatible using other traditional welding techniques. Despite this usefulness with most difficult to weld materials, the refractory or amorphous materials still pose a substantial difficulty to presently available laser welding devices. Unfortunately, many of the refractory materials, such as quartz, are amorphous materials with no precise melting temperature. The weld joint must be carefully monitored to ensure that the weld is not too hot, thereby altering the material into a fluid state that drips away from the fillet. Examples of welding techniques and welding monitoring systems can be found in U.S. Pat. Nos. 4,443,684, 5,155,329, 5,534,103, 6,1,88,041, and 6,191,383.

Although lasers can cut refractory materials, such as quartz, lasers have difficulty welding refractory materials due in part to the amorphous nature of the materials. Despite the potential usefulness to the semiconductor industry, laser fusing of quartz and other refractory materials remains largely unexplored. This is due in part to the unreliability and difficulty of creating full penetration welds in the refractory materials. Refractory materials include quartz, sapphire, rutile, and other refractory materials with a low thermal expansion coefficient. Generally, a weld of these materials requires substantial heat, which affects a larger area then would normally be desired. Furthermore, oxides that are generated during the welding process may contaminate the surface of the weld before the weld can cool down and solidify. What is needed is a method of generating full penetration uncontaminated welds of refractory or amorphous materials, such as quartz, with no precise melting temperature.

SUMMARY OF THE INVENTION

The present invention has been developed in response to the current state of the art, and in particular, in response to these and other problems and needs that have not been fully or completely solved by currently available laser welding techniques and apparatus. Thus, it is an overall object of the present invention to provide full penetration laser welding via high power lasers characteristically selected for the material being welded. This can be accomplished by selecting a laser as a heat source that is adjusted so that the laser is absorbed by the material to be joined. An example of an apparatus facilitating quartz welding is shown in FIGS. 1 and 2.

The present invention facilitates full penetration welds of refractory materials, such as quartz, sapphire, rutile, and other materials with a low thermal expansion coefficient. These qualities are primarily accomplished through optimizing the radiation from a heat source so that it is almost completely absorbed by the materials to be welded. For example, fused quartz may be optimally welded by a high power carbon dioxide laser with a characteristic wavelength of 10.6 $\mu$m in the mid-infrared portion of the electromagnetic spectrum. By selectively varying power, focus, and feed rates of the carbon dioxide laser, the laser emits radiation that is almost completely absorbed by the quartz material. Other lasing media can be selected based on the desired emission wavelength, power needed, and pulse duration.

Accordingly, one aspect of the apparatus is to facilitate full penetration welds.

Another aspect is that the apparatus maintains the integrity of the fused quartz material, keeping the welded materials free from cracking and contamination by oxides.

An additional aspect of the apparatus is that the heat-affected zone created during a quartz weld is kept to a minimum.

Yet another aspect of the apparatus is by varying laser type, focus, power, and feed rates full penetration welds may be created for other welded substances.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment.

Furthermore, the particular features, structures, or characteristics may be combined in any suitable manner in one or more embodiments. In the following description, numerous specific details are provided, such as examples of laser welding apparatus, to provide a thorough understanding of embodiments of the invention. One skilled in the relevant art will recognize, however, that the invention can be practiced without one or more specific details, or with other methods, components, materials, and etcetera. In other instances, well-known structures, materials, or operations are not shown or described in detail to avoid obscuring aspects of the invention.

Reference throughout this specification to "laser welding" or "welding" means a process that unites at least two formerly separate pieces of material by the application of a laser heat source via an intense energy beam applied along the area of contact between the pieces. Laser heat sources used in laser welding are often designed to concentrate high amounts of energy into small, well-defined target areas. The target areas vary in size for each different laser type used in the welding process. For example, a short wavelength laser may optimally generate a target area that is approximately 0.003 inch to 0.006 inch in diameter. The resulting energy density heats, melts, or vaporizes materials in this target area according to characteristics of the material in the target area and the laser's power, focus, and feed rate. When correctly employed, the laser's energy is only applied where it is needed, minimizing the heat affected zone surrounding the target area. A "weld" or "weld joint" denotes material within the target area formed during the welding process. The weld physically connects the formerly separate material pieces. A "defect" represents one or more discontinuities in the weld that cause a testing failure of the weld.

Figure 1:
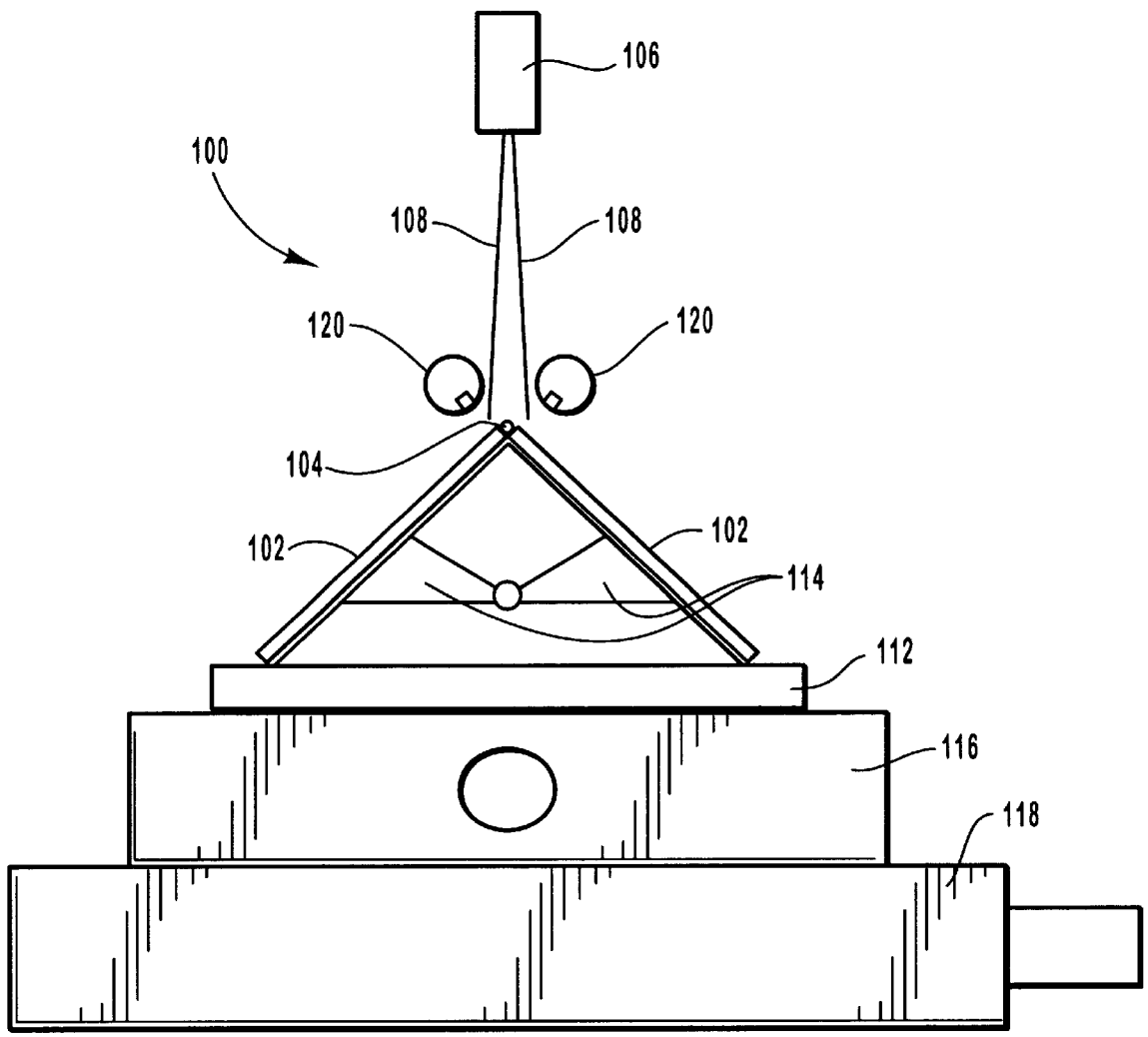
FIG. 1 illustrates an exemplary laser welding system that provides a suitable operating environment for the present invention.

FIG. 1 and the following discussion are intended to provide a brief general description of a suitable laser-welding environment in which the invention may be implemented. Those skilled in the art will appreciate that the invention may be practiced with many types of laser welding system configurations.

Typically laser welding can be accomplished on most materials at very high speeds with low heat generation and little or no distortion. These attributes allow laser welding to be usefully incorporated into mass production lines. Generally, laser welds of a specified material are more predictable than other welds, laser welds may also be mechanically repeatable and thus may be used in mass production processes. Additionally, laser welding only requires "line of site" rather than "physical proximity" to the materials being welded. Physical proximity to the materials is typically necessary for other welding methods that use other heat sources, such as torch, spot, arc, electrode, or contact. Furthermore, the inconsistency and defects of welds from other welding methods make them unreliable for incorporation or deployment into automated mass production processes.

There are many types of lasers that may be used in laser welding, each generating a different wavelength of energy and quality of beam. These differences influence the ability of each laser's beam to cut, reflect, couple with, or be absorbed by each type of material. Some lasers are very powerful, such as the $CO_2$ laser, which can cut through steel.

The $CO_2$ (carbon dioxide) and Nd:YAG (Neodymium-Doped: Yttrium-Aluminum-Garnet) lasers are among the most important industrial lasers. The $CO_2$ laser emits laser light in the infrared region of the spectrum. Infrared radiation is heat, and this laser basically melts through whatever it is focused upon. $CO_2$ lasers are presently used for cutting hard materials. The $CO_2$ laser cuts well with most metals, plastics, wood, quartz, ceramics and glass.

The Nd:YAG laser works well with metals, especially those that are highly reflective. Some non-metals such as ceramics can also be processed with the YAG laser. YAG lasers are also useful in marking applications.

In addition to the two high-power lasers discussed above, other exemplary lasers could be employed to optimize a welding process to a particular material being welded. Some of theses lasers (and their respective wavelengths) which may also vary the power, focus, and feed rates to be optimized for the material include ultraviolet, blue, green, red, NIR (Near Infra-Red), FIR (Far Infra-Red), and tunable lasers. Exemplary ultraviolet lasers and their respective emission wavelengths (nm) include: Argon fluoride (UV) 193 nm, Krypton Fluoride (WV) 248 nm, and Nitrogen (WV) 337 nm. Additional exemplary lasers with emission wavelengths (nm) from the other wavelength categories include Argon (blue) 488 nm, Argon (green) 514 nm, Helium neon (green) 543 nm, Helium neon (red) 633 nm, Rhodamine 6G dye (tunable) 570–650 nm, Ruby ($CrAlO_3$) (red) 694 nm, Nd: YAG (NIR) 1064 nm, and Carbon Dioxide (FIR) 10600 nm.

Reference is first made to FIG. 1 illustrating an exemplary laser welding system 100 or apparatus and environment in which the present invention may be utilized or implemented. FIG. 1 is intended to be illustrative of potential systems 100 that may utilize the present invention and is not to be construed as limiting. FIG. 1 illustrates a laser welding system 100 that welds quartz with a minimum sized heat-affected zone. The system 100 positions the fused quartz plates 102 and quartz filler rod 104 such that upon completion of the weld a full penetration weld is generated in which there is no solidification cracking, or distortion of the surface area outside of the weld zone or the heat-affected zone. In one embodiment, the laser 106 is a continuous wave carbon dioxide laser with a maximum power of at least about 700 Watts. The high power carbon dioxide laser 106 also exhibits a characteristic wavelength of about 10.6 µm. The laser 106 may utilize a defocused laser beam 108 in the mid-infrared portion of the electromagnetic spectrum when welding quartz.

Quartz is traditionally a particularly difficult amorphous material to accurately weld because it has no precise melting temperature. Quartz exhibits a tetrahedral molecular structure, where each Si atom is bonded to 4 Oxygen atoms. The Si—O bond is covalent and strong, which is responsible for quartz's high viscosity since the tetrahedral grid is very rigid. Quartz begins to soften at about 650 C. and softens to a suitable welding consistency between about 700 C. and about 1100 C. Despite this difficulty, quartz also exhibits several useful welding characteristics. For example, quartz has a very small thermal expansion coefficient, approximately 1 ppm/K or about $4 \times 10^{-7}$/K. Quartz also has a reasonably small thermal conductivity of about $3.4 \times 10^{-3}$ cal/sec cm K (compared to copper with a value of about 1 cal/sec cm K and iron at 0.22 cal/sec cm K) allowing the applied heat from the laser to stay concentrated in the target area.

The quartz laser welding technique of the present invention is faster, cleaner and less labor intensive than the welding techniques currently in use. Presently, quartz is welded using archaic torch welding or "glassblowing" techniques that require years of training for the glassblower to perfect. Unfortunately, torch welding introduces oxides into the weld and contaminates the integrity of the quartz. In an effort to remove the oxides and clean the quartz material, the glassblower must devote additional time to applying hydrofluoric acid to the quartz surface structure. In contrast, the laser welding methods of the present invention do not contaminate the quartz, so cleaning with hydrofluoric acid is unnecessary. Furthermore, a laser technician without any previous torch welding experience can produce a weld using the present invention that is far superior to the efforts of an experienced glassblower with years of training. The present invention provides also a method of laser welding that overcomes the difficulty presented by the variable melting point of quartz. Specifically, the radiation from the laser beam 108 is almost completely absorbed by the quartz materials, namely the fused quartz plates 102 and quartz filler rod 104, leading to very rapid heating of the materials to the melting point for quartz. The low thermal expansion coefficient of quartz (approximately $1 \times 10^{-6}$/C.) helps ensure that no solidification cracking is encountered after the weld is made. The size of the heat-affected zone is controlled and minimized due to the concentration of the laser 106. Furthermore, the low thermal coefficient of quartz ensures that the applied heat will stay concentrated in the heat-affected zone. In one embodiment the preferred diameter of the filler rod is about the same as the thickness of the fused quartz plates. When the quartz components are a similar thickness, the laser has a similar penetration into the material, thereby enabling a full penetration weld. For example, in a configuration where the thickness of the fused quartz plates is about 0.125 of an inch and the preferred diameter of the filler rod is also about 0.125 of an inch, the plates and the filler rod will weld at similar power, focus, and feed rate setting on the laser. The filler rod 104 should extend past the edge of the plates about 0.25" inch. This helps in the total fusion of the materials at the ends of the plates 102. To ensure full penetration welding, the laser should start irradiation about 0.25" of an inch before the plates 102 and continue past the end of the plates 102 for about 0.25" of an inch.

Figure 2:
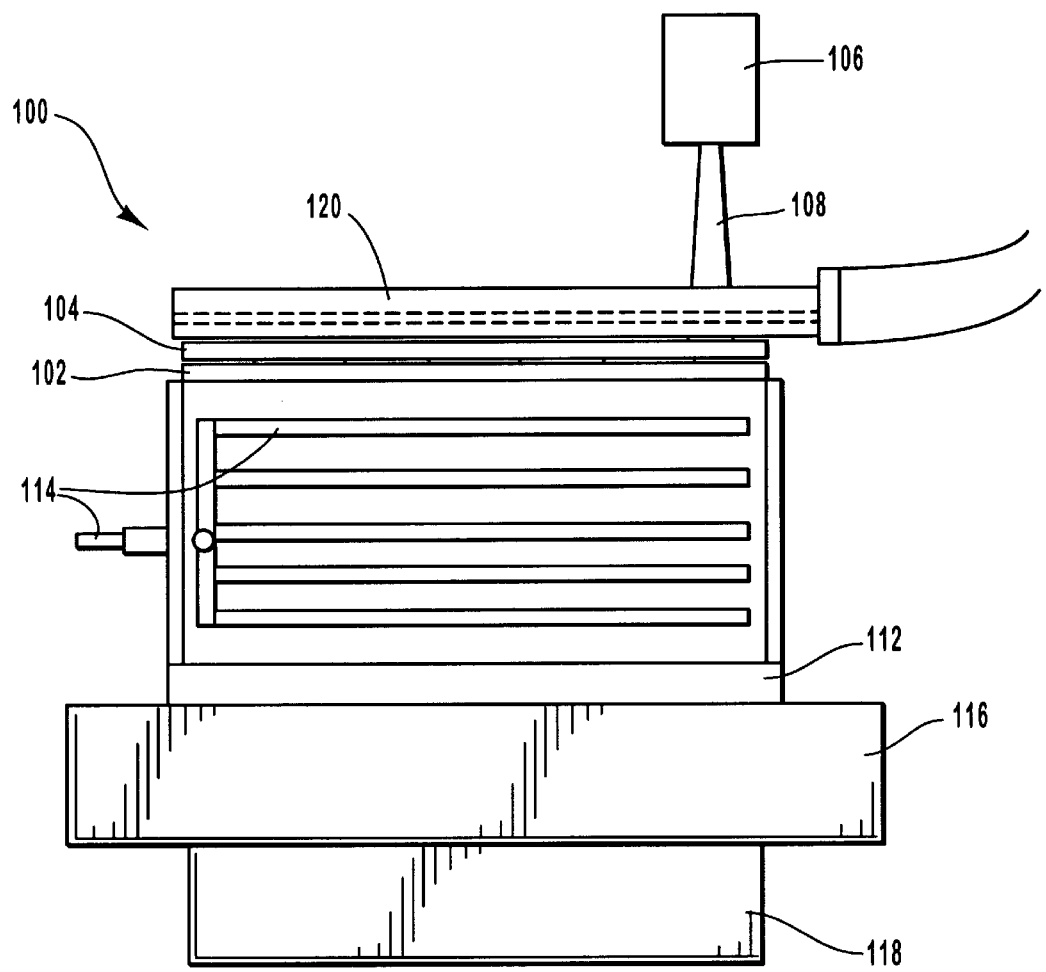
FIG. 2 is a side view of the exemplary laser welding system as illustrated in FIG. 1.

In one embodiment illustrated in FIGS. 1 and 2, the laser weld system 100 has a table support structure for positioning the materials to be welded under the laser 106. The table support structure comprises a welding fixture 112, vacuum clamping ports 114, a support base 116, and an XY motion system 118.

The welding fixture 112 is preferably constructed of a durable lightweight material, such as aluminum, graphite, titanium, steel, or the like. The welding fixture 112 may be flexibly adjusted to support the quartz plates 102 at a variety of angles from about 180 to about 5 during the welding process. As the fixture 112 holds the quartz plates 102 in an inverted V position, a small V is created by the edges of the quartz plates being welded. A filler rod 104 may rest in the small V until the welding process fuses the plates 102 and the filler rod 104. In one embodiment the fixture 112 is permanently fixed to facilitate a squared weld between the materials. During the melting period prior to fusion, the 90 angle of the square weld may cause reflections of the laser beam from the target area. Despite these reflections more than 90% of the radiation from the laser beam is absorbed.

The vacuum clamping ports 114 help secure the fused quartz plates 102 in position on the welding fixture 112. The ports 114 use a suction interface to ensure that the movements of the XY motion system 118 do not alter the position of the plates 102 and quartz filler rod 104 during the welding process. An external vacuum generates the suction for the vacuum clamping ports 114. A central vacuum feed tube connected to the external vacuum helps balance the suction strength of the ports 114 evenly between the quartz plates 102. In one embodiment, the vacuum clamping ports 114 are located laterally on each side of the fixture 112.

The support base 116 is a flat surface holding the welding fixture 112 and mounted to an XY motion system 118. In one embodiment, the XY motion system 118 is electronically controlled to automatically move along a predetermined path in the XY plane at a pre-selected feed rate. As such, the target area of the material to be welded moves underneath the laser beam 108 according to the motion of the system 118. With the support base 116 mounted to the XY motion system 118, the directions of the welds are also electronically controlled. The feed rate of the fused quartz plates 102 and filler rod 104 are related to the movement of the XY motion system 118 under the laser 106. An alternative embodiment allows the laser 106 to move along the XY plane over the quartz surfaces instead of moving the welding structure.

The laser welding system 100 also includes an exhaust system 120, which removes particles, such as silicon oxides, produced during the welding process. The exhaust system 120 is attached to an external exhaust vacuum capable of removing the oxides around the weld. If these particles are not removed then the oxides may contaminate the weld and redeposit themselves on the surface of the quartz. Furthermore, the particles may alter the effectiveness of the laser over the target area. One embodiment surrounds the target area of the laser beam 108 with the exhaust system 120, quickly removing oxide particles created during the welding process. The exhaust system 120 may include a vacuum and a vacuum head with multiple inlets to help in particle removal. One configuration uses multiple vacuum heads to draw particle away from the target area during the laser welding process. In an effort to minimize contamination, one configuration of the present invention continues operation of the exhaust system 120 until the weld has cured and solidified. In addition to oxides, other airborne contaminates are also removed from the target area by the exhaust system 120.

One embodiment provides a mechanism that injects selected airborne particles into the target area via the exhaust system 120. These particles are selected to alter the characteristics of the weld. For example, an injected particle may increase the strength of the weld while another particle may allow the weld to become more flexible or supple.

Optimizing the proper power, feed rate, focal length or focus setting for the carbon dioxide laser 106 allows a fusion to occur when the plates 102 are passed underneath the laser beam 108. The feed rate and amount of beam defocus are determined to be important parameters to consider when welding. The beam is defocused according to the size of the filler rod. Typical feed rates vary from 0.01 inches to 10 inches per minute depending on the laser power. Typical laser power settings for welding quartz range between about 200 Watts and about 1 Kilowatt, and more preferably between about 350 Watts and about 500 Watts. For example, a laser with a focal length of about 5" and a power setting of 435 Watts can properly weld 0.125-inch quartz plates 102 and the filler rod 104 when the XY motion system uses a feed rate of about 0.55 inch per minute.

FIG. 2 is a side view of the laser welding system 100 of FIG. 1 As can be seen the quartz plates 102 are held to the aluminum support structure 112 via vacuum clamping ports 114. In addition, the exhaust system 120 extends over the surface of the weld created between the quartz filler rod 104 and quartz plates 102 upon exposure to the radiation from the laser beam 108. The XY stage 116 enables the laser 106 to remain stationary while the specific points of the weld are passed underneath the surface.

One embodiment of the present invention uses two lasers optimized for each material to be fused. For example, a carbon dioxide laser may be used to prepare quartz material while a YAG laser may be used to prepare titanium, stainless steel, kovar, nickel, copper, or other metal. Once the materials are prepared they may be fused through compression or by using a compatible filler rod.

Figure 3:
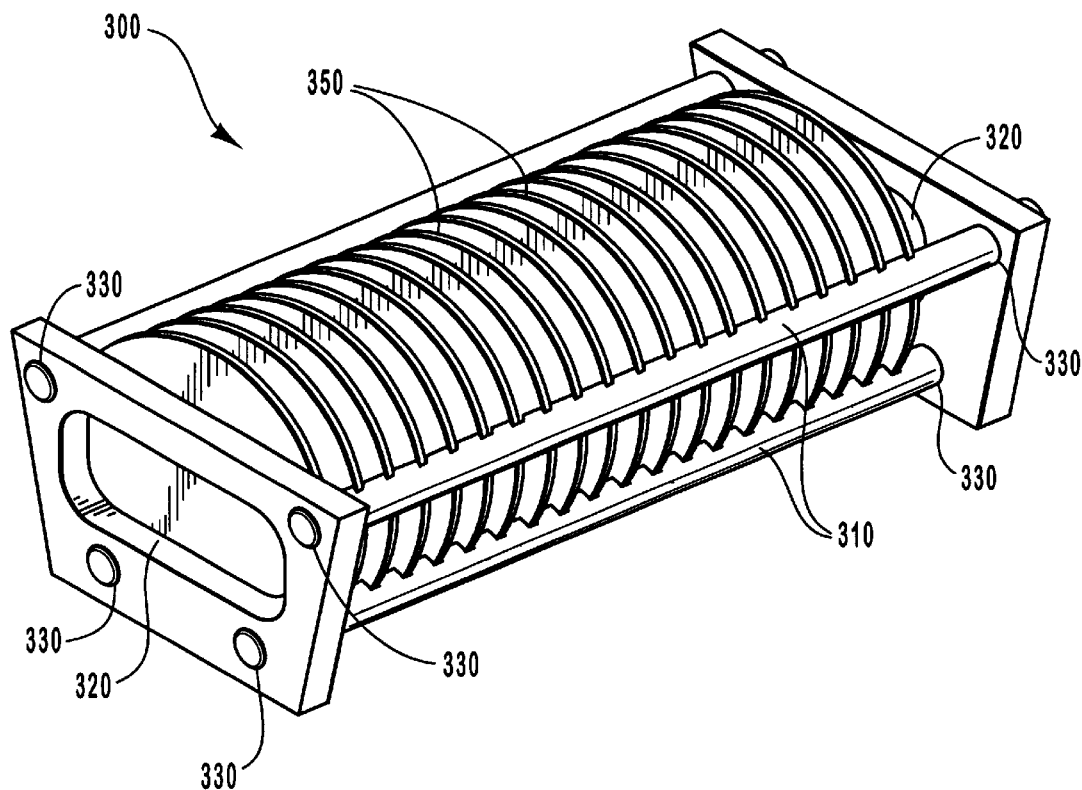
FIG. 3 illustrates a quartz wafer boat structure with laser welds.
Figure 4:
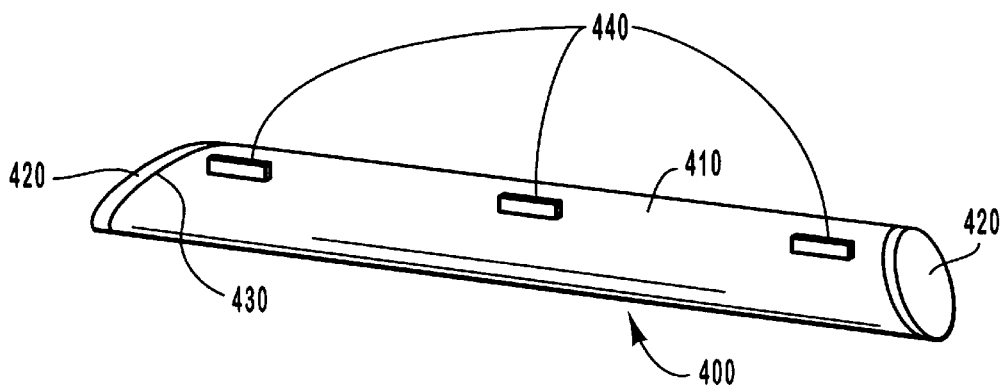
FIG. 4 is a perspective view of a laser cylinder with welded quartz output windows.

The following examples in FIGS. 3 and 4 are given to illustrate various embodiments, which may be made with the present invention. It is to be understood that the following examples are not comprehensive or exhaustive of the many types of embodiments, which can be prepared in accordance with the present invention.

FIG. 3 illustrates a quartz rack or boat 300 useful in the manufacturing process of integrated circuit wafers 350. The quartz boat 300 is an open quartz structure that holds semiconductor wafers 350 during the doping phase of the manufacturing process. Typically the doping phase requires operation of the boat 300 in high temperatures, between about 750 and about 800 C. Quartz is one of the few materials that withstand such temperatures without interfering with the doping process.

Unfortunately, the quartz boats presently available are hand welded using a torch welding method, which introduces contaminates into that boat structure. Each support rod 310 must be individually welded to the end supports 320. One of the problems with the torch welding process is the introduction of contaminates to the quartz boat. Contamination is caused by the welding process and by the required physical handling of the boat 300. During the doping phase these contaminates can transfer from the boat into the semiconductor wafers. As the integrated circuit wafers are created in the high-temperature doping phase, contaminants depart from the hand-welded boat and are embedded in the wafers. This can potentially ruin the batch of integrated circuit wafers. Another problem with the presently available quartz boats is that the hand welds are not full penetration welds. These inferior welds begin to deteriorate during the high-temperatures of the doping phase. Over time the quartz boat hand welds will gradually melt until the quartz boat must be replaced.

The present invention allows the quartz boat 300 to be manufactured using the previously described laser welding techniques to drastically reduce the number contaminate particles and extend the product life expectancy for the quartz boat. The laser welding system allows the quartz boats to be assembled in a sterile, precise, automated manner. As the torch welding technique is not used, less time needs to be devoted to cleaning individual parts in hydrofluoric acid, which can further compromise the surface structure. Furthermore, the present invention is substantially easier to operate. The welding system enables a technician without any previous "glassblowing" experience to produce a weld far superior to the efforts of an experienced glassblower with years of training.

All of the components necessary to create this boat 300 may be cut assembled and welded by one automated laser assembly system dramatically decreasing the contaminates in the boat 300. For example, one embodiment notches the support rods 310 to stabilize and evenly separate the silicon wafers 350 for more efficient doping penetration. These notches may be cut into the support rods 310 using the laser from the welding system. The laser may also cut the windows and bore holes in the end supports 320. Following a mechanical assembly of the support rods 310 and end supports 320, the target areas of the laser welding system may be placed over the contact points between the support rods 310 and the end supports 320. By changing the power, focus, and feed rate of the laser, the laser welding system may then generate full penetration welds 330 at the target areas. The reduction of contaminates in the boat 300 also increases the efficiency of the integrated circuit baking process, because fewer wafers are lost to contamination.

FIG. 4 illustrates a round or an oval laser tube that benefits from quartz laser welding to produce full penetration welds. The laser welding system 100 may create an assembly of quartz components lenses, windows, and optical cells to create laser tubes 400 or chemical irradiation assemblies. The quartz laser tube 400 contains quartz windows 420 that are welded at laser welds 430 to the quartz laser tube 410. The quartz windows 420 are welded at Brewster's Angle, the angle necessary for all low-gain lasers, to the laser tube 410. Full penetration welds between the lenses and the tube dramatically reduce the diffraction of any irradiation placed through the laser tube 400. The removal of contaminates from the welds increases the overall quality of the quartz lens 420 and the efficiency of the laser tube 400. The laser tube 400 may include electrodes 440, which can also be welded in place within the tube 410 for gas lasers.

In a laser, the laser tube 400 contains a lasing medium, which may be solid or gas. The lasing medium is "pumped" to get the atoms of the medium into an excited state.

Electrodes 440 provide electrical discharges or very intense flashes of light to pump the lasing medium and create a large collection of excited-state atoms (atoms with higher energy electrons). For the laser to work efficiently, a group of atoms in the excited state are necessary. The atoms are excited to a level that is two or three levels above the ground state. This increases the degree of population inversion, especially if the lower laser level is not the ground state. The population inversion is the number of atoms in the excited state versus the ground state or the lower laser level. Once the lasing medium is sufficiently pumped, it contains a collection of atoms with some electrons sitting in excited levels. The excited electrons have energies greater than the more relaxed electrons. Just as the electron absorbed some amount of energy to reach this excited level, it can also release this energy. This emitted energy comes in the form of photons or light energy. The photon emitted has a very specific wavelength or color that depends on the state of the electron's energy when the photon is released. Two identical atoms with electrons in identical states will release photons with identical wavelengths.

The photon that any atom releases has a certain wavelength that is dependent on the energy difference between the excited state and the ground state. If this photon, possessing a specific energy and phase, encounters another atom that has an electron in the same excited state, a phenomenon called stimulated emission can occur. The first photon can stimulate or induce atomic emission such that the subsequent emitted photon from the second atom vibrates in phase, with the same frequency, and direction as the incoming photon.

The other characteristic to a laser is a pair of partially transparent mirrors or quartz windows 420, one at each end of the lasing medium. Photons, with a very specific wavelength and phase, reflect off the windows 420 to travel back and forth through the lasing medium. In the process, they stimulate other electrons to make the downward energy jump and can cause the emission of more photons of the same wavelength and phase. A cascade effect occurs, and soon we may have propagated many, many photons of the same wavelength and phase. The windows 420 at one end of the laser is "half-silvered" or partially transparent at the laser wavelength, meaning it reflects some light and lets some light through. The light that makes it through is the laser beam light.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. A method of welding quartz, comprising the steps of:
    selecting at least two pieces of quartz to be welded together; and
    irradiating the at least two pieces of material with continuous wave $CO_2$ laser light such that a full penetration weld is formed between the at least two pieces at a selected location.

2. The method as recited in claim 1, further comprising the step of ventilating oxide particles before they redeposit and contaminate the quartz.

3. The method as recited in claim 1, further comprising the step of ventilating particles around the selected location to carry away contaminates before they redeposit and contaminate the quartz or the weld.

4. The method as recited in claim 1, wherein the at least two pieces of quartz are about the same thickness.

5. The method as recited in claim 4, wherein the at least two pieces of quartz are fused quartz plates about 0.125 inch thick.

6. The method as recited in claim 1, wherein the wavelength of the laser light is about 10.6 $\mu$m.

7. The method as recited in claim 1, wherein full penetration welds are accomplished at the selected location by varying the power, focal length, and feed rates of the laser.

8. The method as recited in claim 7, wherein the focal length for quartz plates is between about 3 inches and about 7 inches.

9. The method as recited in claim 8, wherein the focal length for fused quartz plates is between about 4 inches and about 6 inches.

10. The method as recited in claim 9, wherein the focal length for 0.125 inches fused quartz plates is about 5 inches.

11. The method as recited in claim 7, wherein the feed rate is between about 0.25 inches per minute and about 5 inches per minute.

12. The method as recited in claim 11, wherein the feed rate is between about 0.5 inches per minute and about 3 inches per minute.

13. The method as recited in claim 12, wherein the feed rate is about 0.55 inches per minute.

14. The method as recited in claim 7, wherein the laser power is about 435 Watts, the focal length is about 5 inches, and the feed rate is about 0.55 inches per minute.

15. The method as recited in claim 1, wherein power of the laser is in the range of from about 200 Watts to about 700 Watts.

16. The method as recited in claim 15, wherein power of the laser is in the range of from about 350 Watts to about 500 Watts.

17. The method as recited in claim 16, wherein power of the laser is about 435 Watts.

18. A method of laser welding materials, comprising the steps of:
    selecting at least two pieces of material to be welded together, the at least two pieces of material being selected from the group consisting of quartz, sapphire, and rutile; and
    irradiating the at least two pieces of material with continuous wave laser light such that a full penetration weld is formed between the at least two pieces are welded together at a target area.

19. The method as recited in claim 18, wherein full penetration welds are obtained by varying the power, focus and feed rates of the laser.

20. The method as recited in claim 18, further comprising, ventilating particles generated at the target area to carry away contaminates before they redeposit and contaminate the material or the weld.

21. The method as recited in claim 18, wherein the laser is a Nd:YAG laser.

22. The method as recited in claim 18, wherein the range of power for the laser is from about 200 Watts to about 1000 Watts.

23. An apparatus for laser welding fused quartz plates together, said apparatus comprising:
    a. a fixture for holding fused quartz plates;
    b. a laser for welding the quartz plates;
    c. optics for defocusing the laser light onto target areas on the quartz plates during welding;

d. a ventilation system for removing particles from target areas during welding; and e. one or more vacuum clamping ports for securing the quartz plates in position during welding.

24. An apparatus for laser welding fused quartz as claimed in claim 23, further comprising an automated X-Y table for moving the target area beneath the laser.

25. An apparatus for laser welding fused quartz as claimed in claim 23, wherein the laser is a continuous wave carbon dioxide laser.

26. An apparatus for laser welding fused quartz as claimed in claim 23, wherein the laser has a power range of from about 200 Watts to about 1000 Watts.

27. An apparatus for laser welding fuse quartz plates together, said apparatus comprising:
 - a fixture for holding fused quartz plates that can be flexibly adjusted to support the quartz plates at a variety of angles, the fixture capable of holding the quartz plates in an inverted "V" position;
 - a laser for welding the quartz plates;
 - optics for defocusing the laser light onto target areas on the quartz plates during welding;
 - a ventilation system for removing particles from target areas during welding; and
 - one or more vacuum clamping ports used to help secure the quartz plates in position on the fixture.

28. An apparatus for laser welding fused quartz as claimed in claim 27, further comprising an automated X-Y table for moving the target area beneath the laser.

29. An apparatus for laser welding fused quartz as claimed in claim 27, wherein the laser is a continuous wave carbon dioxide laser.

30. An apparatus for laser welding fused quartz as claimed in claim 27, wherein the laser has a power range of from about 200 Watts to about 1000 Watts.

* * * * *